US005301927A

United States Patent [19]

Schimpff

[11] Patent Number: 5,301,927

[45] **Date of Patent: * Apr. 12, 1994**

[54] METHOD OF MAKING CONCRETE SWITCH CROSS TIES

[75] Inventor: Frithjof Schimpff, Wiesbaden, Fed. Rep. of Germany

[73] Assignee: Wayss & Freytag Akiengesellschaft, Frankfurt am Main, Fed. Rep. of Germany

[ * ] Notice: The portion of the term of this patent subsequent to Jun. 23, 2009 has been disclaimed.

[21] Appl. No.: 18,009

[22] Filed: Feb. 16, 1993

Related U.S. Application Data

[60] Division of Ser. No. 865,210, Apr. 8, 1992, Pat. No. 5,227,112, which is a continuation-in-part of Ser. No. 434,683, Oct. 5, 1989, Pat. No. 5,124,093.

[30] Foreign Application Priority Data

Jul. 14, 1988 [DE] Fed. Rep. of Germany ....... 3823860

[51] Int. Cl.[5] ........................ B28B 1/14; B28B 13/06; B28B 25/00; B29C 33/40

[52] U.S. Cl. .................................. 264/40.1; 264/219; 264/228; 264/277; 264/278; 264/279; 264/279.1; 264/297.9; 264/316; 264/333; 264/334; 264/338

[58] Field of Search ...................... 264/40.1, 138, 333, 264/219, 228, 277, 222, 279, 256, 334, 35, 261, 263, 279.1, 297.9, 39, 40.5, 278, 337, 338, 313, 316, 154–156; 425/111, 121, 123; 249/86, 94, 97

[56] References Cited

U.S. PATENT DOCUMENTS 4,495,127 1/1985 Thim .

5,124,093 6/1992 Schimpff ................................ 249/86

FOREIGN PATENT DOCUMENTS 34402247 8/1987 Fed. Rep. of Germany .

*Primary Examiner*—Karen Aftergut

*Attorney, Agent, or Firm*—Herbert Dubno; Andrew Wilford

[57] ABSTRACT

A switch cross tie is made in a mold having a base plate formed with a plurality of holes in a predetermined pattern corresponding to a particular type of concrete switch cross tie by first overlying the entire base plate of a mold with a covering sheet provided with markings in a pattern corresponding to that of the holes needed for another particular type of concrete cross ties. This covering sheet overlies and blocks all the holes formed in the base plate and it is fixed in place atop the base plate. Then the operator or a computer-guided drill press cuts through the covering sheet and into the base plate at each of the markings to form thereat a respective new hole. Each such new hole is fitted with an anchor, and the mold is filled with concrete over and around the anchors with the covering sheet blocking all the holes other than the new holes. It is important that the covering sheet be sufficiently strong to inhibit entry of concrete through it into any of the holes other than the new holes. The concrete is allowed to cure or set and then the set concrete and the anchors are removed from the mold as a tie with anchors imbedded in it at locations corresponding to the new holes.

6 Claims, 4 Drawing Sheets

METHOD OF MAKING CONCRETE SWITCH CROSS TIES

CROSS REFERENCE TO RELATED APPLICATIONS

This application is a division of copending patent application 07/865,210 filed Apr. 8, 1992 (now U.S. Pat. No. 5,227,112 issued Jul 13, 1993) as a continuation-in-part of then copending application 07/434,683 filed Oct. 5, 1989 (now U.S. Pat. No. 5,124,093 issued Jun. 23, 1992) as the national phase of PCT application EP89/00644 filed Jun. 8, 1989 and itself referring back to German patent application 3,823,860 filed Jul. 14, 1988.

FIELD OF THE INVENTION

The present invention relates to the manufacture of concrete railway ties. More particularly this invention concerns the mass-production casting of concrete switch cross ties.

BACKGROUND OF THE INVENTION

As a rule, because of mass production, molds for concrete series-produced finished railroad ties are made to be very rigid and durable. This applies particularly to ties produced in succession in a prestressing bed. In this case, there are very high demands for a particularly accurate measurement of the positions of the tie components. Therefore, the construction elements are fastened in bores of the mold which have to be positioned extremely accurately.

In the case of railway ties, the construction components—anchor screws or sleeves for the fastening screws of the track cross ties—are located on the upper side of the cross tie. The upper side of the cross tie lies in the mold, on the mold bottom, that is the cross tie is molded upside down. Thus, the bottom plate serves as a pattern for the insertion of the construction components.

In large series, a hole template is often used. The pattern which has to be produced for each type of tie only slightly influences the cost of the individual tie. But in the case of smaller production series of a certain cross-tie type, the costs related to the bottom plate serving as a pattern for the construction components can make the process uneconomical.

Particularly complicated is the making of the holes in the patterns for the switch cross ties. In normal track ties, the rail axes cross the switch ties perpendicularly. The construction components for the fastening of the rail to the switch tie and correspondingly the bores fixing them to the bottom plate of the mold are located on the median axis at a spacing determined by the gauge of the system.

Things are different in the case of switch cross ties. Here as a rule, the rail axes cross the switch tie axes at various normally non-right angles. Up to now, for fastening of rail tracks which do not cross the ties at right angles slabs were used which had their bores located on the axis and which required construction components arranged in numerous axes scattered over the surface of the switch ties for the fastening screws of the slabs and corresponding bores for the fastening of the construction components in the bottom plate of the mold. A mold for switch cross ties made of concrete is known from German patent 3,440,247. This mold has a bottom plate made of steel which is accurately fitted between side walls. Nonetheless with it the production of new bottom plates with holes in different locations and their insertion is expensive.

OBJECTS OF THE INVENTION

It is therefore an object of the present invention to provide an improved system for making concrete switch cross ties.

Another object is the provision of such an improved system for making concrete switch cross ties which overcomes the above-given disadvantages, that is which allows many different types of switch cross ties to be made in the same mold.

SUMMARY OF THE INVENTION

A method of making a concrete switch tie in a mold having abase plate formed with a plurality of holes in a predetermined pattern corresponding to a particular type of concrete switch cross tie according to this invention comprises the steps of first overlying the entire base plate of a mold with a covering sheet provided with markings in a pattern corresponding to that of the holes needed for another particular type of concrete cross ties. This covering sheet overlies and blocks all the holes formed in the base plate and it is fixed in place atop the base plate. Then the operator or a computer-guided drill press cuts through the covering sheet and into the base plate at each of the markings to form thereat a respective new hole. Each such new hole is fitted with an anchor, and the mold is filled with concrete over and around the anchors with the covering sheet blocking all the holes other than the new holes. It is important that the covering sheet be sufficiently strong to inhibit entry of concrete through it into any of the holes other than the new holes. The concrete is allowed to cure or set and then the set concrete and the anchors are removed from the mold as a tie with anchors imbedded in it at locations corresponding to the new holes.

With this system therefore a single mold can be used to make many different types of switch cross ties. It is not necessary to use a new mold for each type.

According to the invention the positions of the new holes are determined by a computer program. The sheet can be made of metal, a synthetic resin that is provided on one side with an adhesive for sticking it to the mold base plate, or a synthetic paper.

It is also within the scope of this invention to form in the base plate a longitudinal slot or a multiplicity of holes in a regular pattern and then to block all of the holes. Only the holes needed for a particular type of switch cross tie are unblocked and then the method proceeds as described above. In this method the needed holes can be determined by positioning on the mold base plate a template provided with a plurality of hole markings corresponding to the holes in the base plate with the markings each overlying a respective hole, sets of the markings corresponding to the holes for particular respective cross ties being characteristically marked on the template. Subsequently the holes corresponding to a particular set of markings are unblocked. The locations of the markings are established by computer, for instance being plotted by a computer program and then punched out by a computer-operated drill or the like, or a computer-guided tool can remove the plugs and then insert the anchors.

The mold can be formed as described in the above-cited German patent document to have a length more than sufficient to accommodate a plurality of cross ties. In this case longitudinal spacers are fitted in the mold to subdivide it into sections each corresponding to a single such cross tie. The covering sheet extends the full length of the mold. The rail plate used with the cross tie produced by such a mold has bore holes offset from its own axis so as to be alignable with respective anchors of the cross tie.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
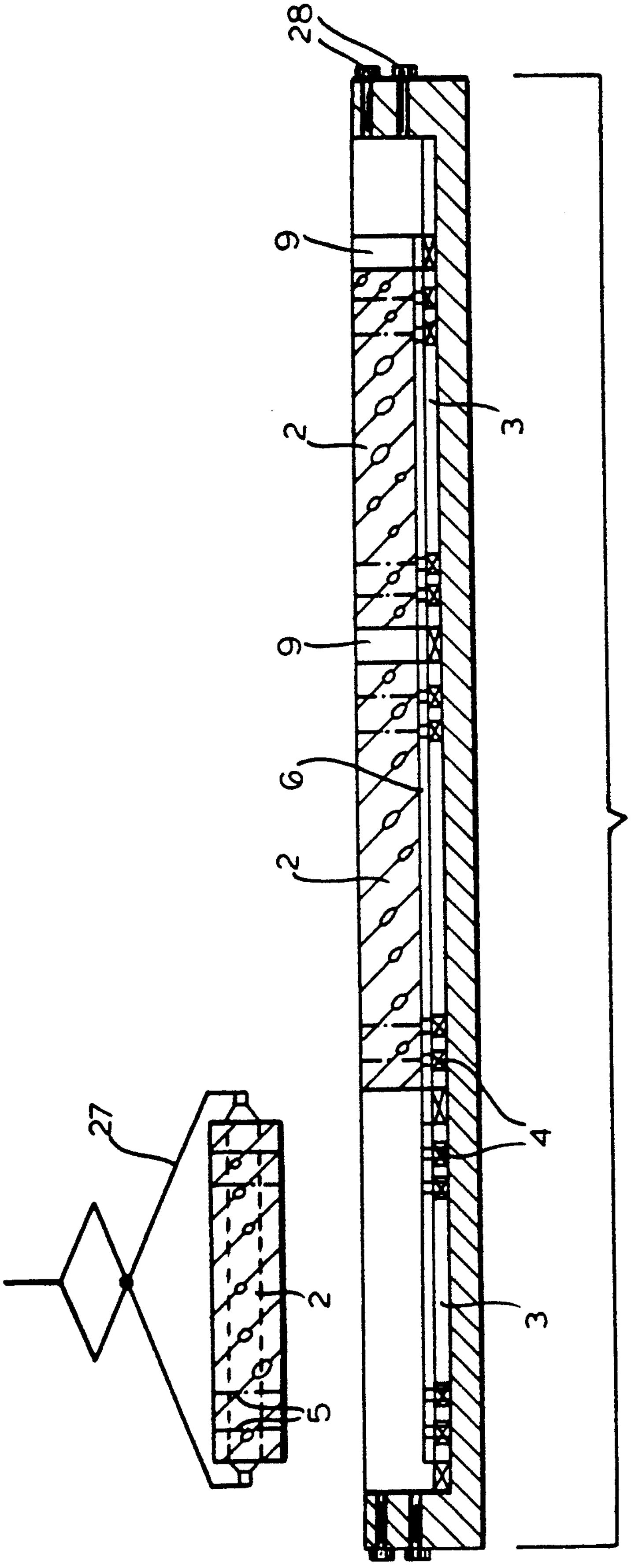
FIG. 1 is a longitudinal and vertical section through a mold assembly for making a plurality of switch cross ties according to the invention.

As seen in FIG. 1 a row of switch cross ties 2 is made in a manufacturing installation 1 for concrete finished parts in a prestressing bed between lateral side walls on bottom plates 3 of the type described in above-mentioned German patent 3,440,247. The cross ties 2 arranged in a row are separated in the mold 1 by spacers 9. Holes 4 in the bottom plates 3 establish the position of construction components 5, typically anchor sleeves or threaded anchor bolts, for the cross ties 2. The mold 1 is sufficiently long to accommodate a plurality of such ties 2 end to end and is provided with a tie-removing device 27 and with prestressing equipment 28.

Figure 2:
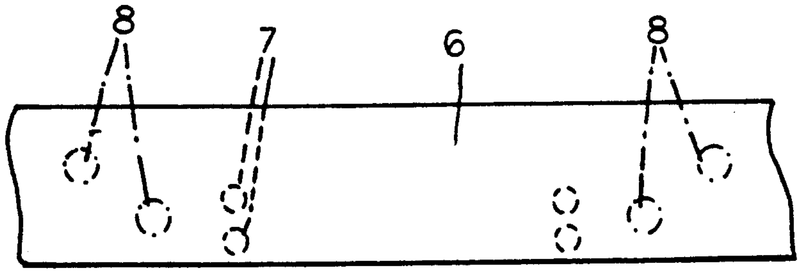
FIG. 2 is a top view of the cover or mask used in the system of FIG. 1.
Figure 3:
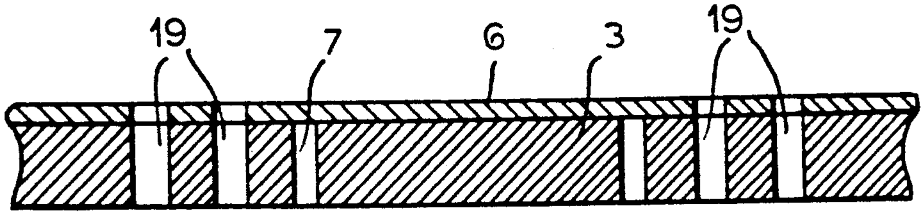
FIG. 3 is a large-scale vertical section through a portion of the system of FIG. 1.

FIGS. 2 and 3 show a mask covering sheet 6 overlying the bottom plate 3. The positions of the construction components 5 are marked on it. This covering sheet 6, which for instance can be glued in place, covers the holes 7 of the bottom plate 3 left over from previous uses. The marks 8 previously made on the covering 6 are used to locate the places where the holes 19 for the new switch tie to be cast are drilled, the covering sheet 6 remaining in place on top of the preexisting holes 7.

Figure 4:
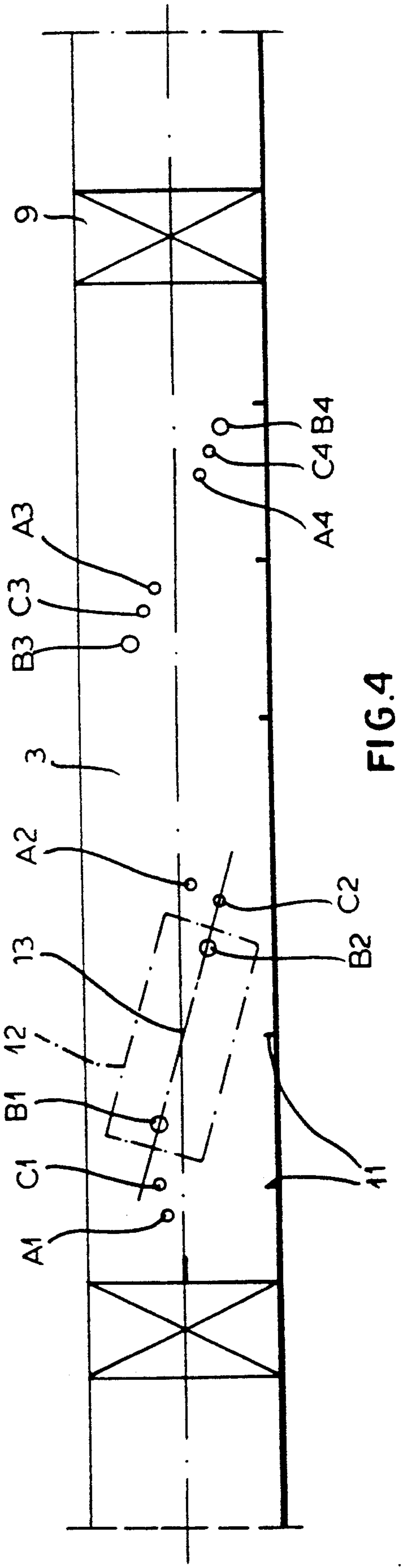
FIG. 4 is a top view of the cover of FIG. 2.
Figure 5:
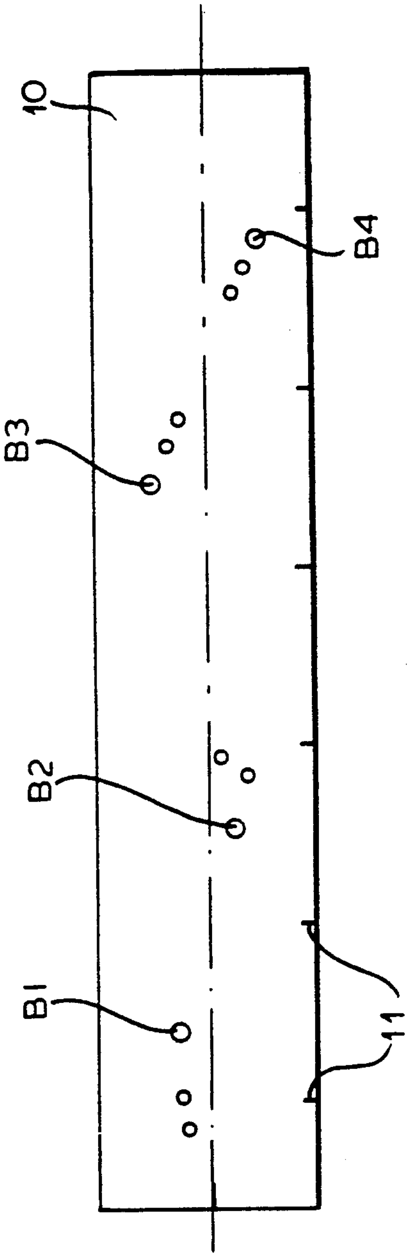
FIG. 5 is a top view of a template used for the system of FIG. 1.

The bottom plate 3 of FIGS. 4 and 5 has holes $A_1$–$A_n$, $B_1$–$B_n$, $C_1$–$C_n$, etc. The bottom plate 3 covers only the length of one cross tie in the prestressing mold 1. Spacers 9 are provided between longitudinally adjacent bottom plates 3. A locating or search template 10 is used to locate the holes $B_1$–$B_n$ pertaining to a certain type B of cross tie. The search template 10 is positioned with the aid of locator marks 11 which are provided on the search template 10 as well as on the bottom plate 3. The holes $B_1$–$B_n$ pertaining to type B cross ties are indicated in the outer field of the other holes $A_1$–$A_n$, $C_1$–$C_n$, and so on, and marked in a particular way. This way, they are clearly findable in the group of the other holes, and plugs blocking the respective holes can be removed from these holes and the fastening devices for anchor sleeves can be inserted, much as described in the above-cited German patent.

The outline 12 of a tie plate provided with holes on its longitudinal axis 13 is provided on the hole template of the bottom plate 13. It is clear that such a plate is not set parallel to the tie, but at an angle thereto as is common in a tie used at a switch location.

Figure 6:
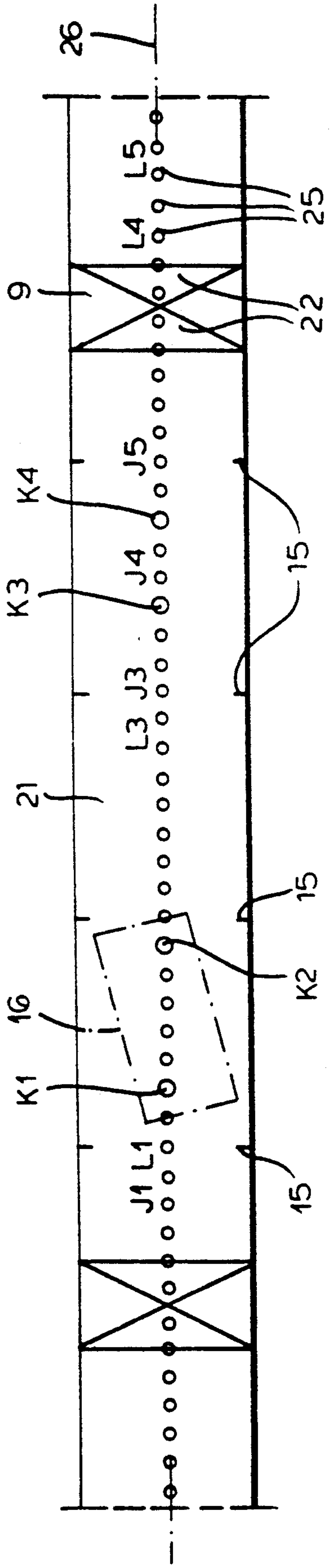
FIGS. 6 and 7 are views similar to FIGS. 4 and 5 of another system according to the invention.
Figure 7:
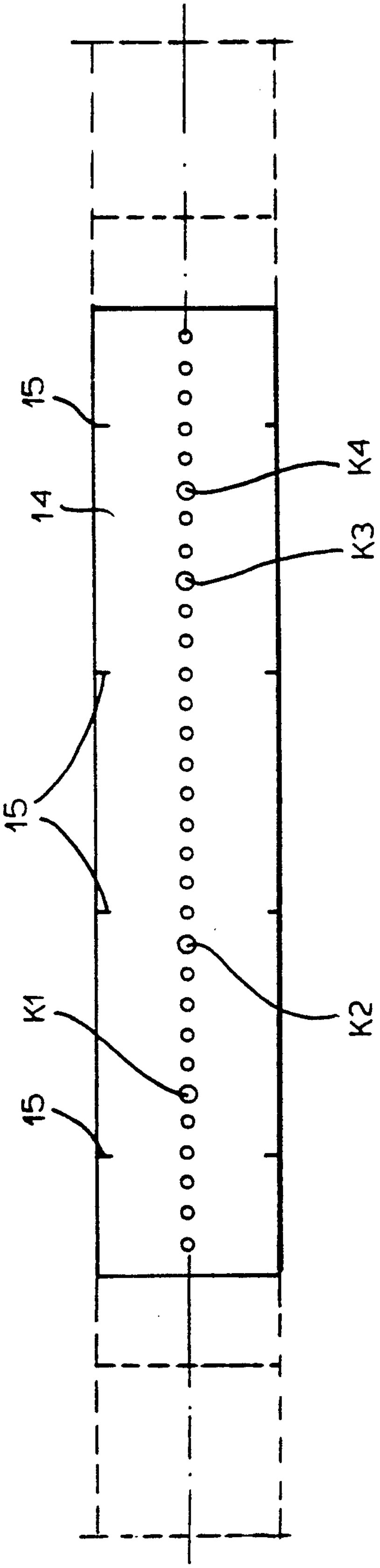

FIGS. 6 and 7 show a continuous bottom plate 21 provided with a fixed pattern of holes 25. The holes 25 all lie on the central longitudinal axis 26 at equal distances from one another. A search template 14 is positioned on the bottom plate 21 with the aid of centering marks 15 which are provided on the bottom plate 21 as well as on the search template 14. The holes $K_1$–$K_n$ for a type K cross tie is indicated in the field of the holes $J_1$–$J_n$, $L_1$–$L_n$, etc. of the other remaining cross-tie types, and are marked in a special way. With aid of the special markings along the outer fields the holes to be utilized can be easily distinguished from the surrounding holes, freed of the plugs and fitted with the anchor sleeves or fastening devices for the insertion of the construction components.

Figure 9:
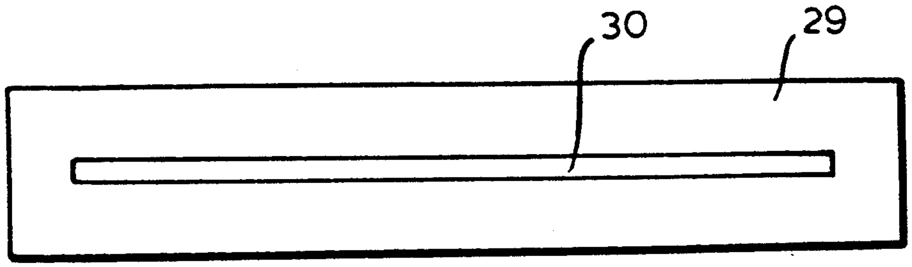
FIG. 9 is a top view of another mold base plate according to this invention.

FIG. 9 shows how instead of a row of evenly spaced holes 25, it is possible to form a base plate 29 with a longitudinally extending slot 30. This slot 30 is covered by the same template shown in FIG. 7 and is used as is the base plate 21 of FIG. 6.

Figure 8:
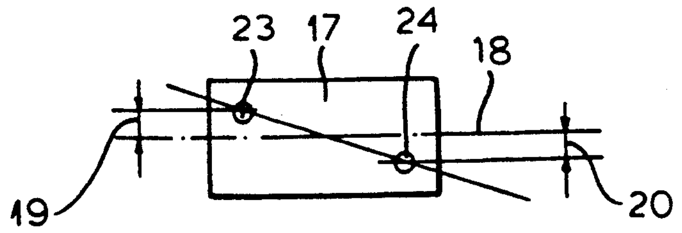
FIG. 8 is a top view of a tie plate for a switch cross tie according to the invention.

In the same way, the holes 22 for the fixation of the spacers 9 are found on the drilling template of the bottom plate 21, the outline 16 of a tie plate 17 drilled in a special manner is entered. As seen in FIG. 8 the holes 23, 24 do not lie on the median axis 18 of the plate 17, but are spaced from this axis by distances 19 and 20 which as a rule are different from each other so that they can register with the thereto pertaining template holes $K_1$, $K_2$.

I claim:

1. A method of making a concrete switch cross tie, the method comprising the steps of sequentially:

a) forming in a base plate of a mold a multiplicity of holes in a regular pattern;

b) blocking each of the holes with a respective temporary covering;

c) unblocking all of the holes corresponding to a particular switch cross tie;

d) providing on the base plate at each of the unblocked holes an anchor;

e) filling the mold with concrete on the base plate over and around the anchors;

f) setting the concrete; and g) removing the set concrete and the anchors from the mold as a tie with anchors imbedded in the tie at locations corresponding to the unblocked holes.

2. The tie-making method defined in claim 1 wherein the multiplicity of holes is formed as a longitudinally extending slot.

3. The tie-making method defined in claim 1, further comprising the step between steps b) and c) of positioning on the mold base plate a template provided with a plurality of hole markings corresponding to the holes in the base plate with the markings each overlying a respective hole, sets of the markings corresponding to the holes for particular respective cross ties being characteristically marked on the template, in step c) the holes corresponding to a particular set of markings being unblocked.

4. The tie-making method defined in claim 3 wherein locations of the markings are established by computer.

5. The tie-making method defined in claim 1 wherein the mold is of a length more than sufficient to accommodate a plurality of cross ties, the method further comprising the step before step e) of providing longitudinal spacers in the mold subdividing the mold into sections that each correspond to a single such formed cross tie.

6. The tie-making method defined in claim 5 wherein the covering is a sheet that extends a full length of the mold.

* * * * *